(12) United States Patent
Kierans et al.

(10) Patent No.: US 8,332,808 B2
(45) Date of Patent: Dec. 11, 2012

(54) SYSTEMS AND METHODS OF GENERATING A QUALITY ASSURANCE PROJECT STATUS

(75) Inventors: Noel A. Kierans, Acworth, GA (US); Julius H Rainwater, Marietta, GA (US)

(73) Assignee: Celtic Testing Expert, Inc., Acworth, GA (US)

( * ) Notice: Subject to any disclaimer, the term of this patent is extended or adjusted under 35 U.S.C. 154(b) by 646 days.

(21) Appl. No.: 12/582,971

(22) Filed: Oct. 21, 2009

(65) Prior Publication Data
US 2011/0093833 A1    Apr. 21, 2011

(51) Int. Cl.
*G06F 9/44*    (2006.01)

(52) U.S. Cl. ............ 717/101; 717/120; 717/124

(58) Field of Classification Search .......... None
See application file for complete search history.

(56) References Cited

U.S. PATENT DOCUMENTS

| | | | |
|---|---|---|---|
| 7,721,257 B2* | 5/2010 | Demuth et al. | 717/120 |
| 8,151,247 B2* | 4/2012 | Wefers | 717/124 |
| 2006/0041864 A1* | 2/2006 | Holloway et al. | 717/124 |
| 2006/0123392 A1* | 6/2006 | Demuth et al. | 717/120 |
| 2007/0234300 A1* | 10/2007 | Leake et al. | 717/124 |
| 2008/0066050 A1* | 3/2008 | Jain et al. | 717/101 |
| 2008/0082956 A1* | 4/2008 | Gura et al. | 717/101 |
| 2008/0120598 A1* | 5/2008 | Imeshev | 717/120 |
| 2008/0127041 A1* | 5/2008 | Gura | 717/101 |
| 2008/0134134 A1* | 6/2008 | Avritzer et al. | 717/101 |

OTHER PUBLICATIONS

Frank J. Arcuri, A Development of Performance Metrics for Forecasting Schedule Slippage, Thesis submitted to the Faculty of Virgina Polytechnic Institute and State University in parital fulfillment of the requirements for the degree of Master of Science in Civil Engineering, 2007, pp. 18-20, 23-37, 60-68 and 94-105.*
EPA, Data Quality Assessment: A Reviewer's Guide, EPA QA/G-9R, Office of Environment Information, 2006, p. 3-7, 13, 14, 19 and 20.*
Ladan Malazizi, A Data Quality Assessment Algorithm with Application in Predictive Toxicology, Department of Computing, School of Informatics, University of Bradford, 2006, pp. 136-139.*

* cited by examiner

*Primary Examiner* — Thuy Dao
*Assistant Examiner* — Mongbao Nguyen
(74) *Attorney, Agent, or Firm* — Raj Abhyanker, P.C.

(57) ABSTRACT

A method, apparatus and a system for a quality assurance analytic technique and system are disclosed. In one embodiment, a method of a client device includes determining a forecasted completion date of a communication of a quality assurance testing data from a quality center database to a server device comprising a processor to analyze based on an algorithm the quality assurance testing data. In addition, the method includes creating a quality assurance project status of a communication of a baseline complete date to the server device to analyze the baseline complete date and the forecasted completion date.

18 Claims, 10 Drawing Sheets

SYSTEMS AND METHODS OF GENERATING A QUALITY ASSURANCE PROJECT STATUS

FIELD OF TECHNOLOGY

This disclosure relates generally to the technical field of software testing and, in several embodiments, to systems and methods of generating a quality assurance project status and a forecasted completion date.

BACKGROUND

Quality assurance (QA) may be a planned and systematic production processes that provide confidence in a product's suitability for its intended purpose. It may be a set of activities intended to ensure that products (goods and/or services) satisfy customer requirements in a systematic, reliable fashion. Quality assurance for software programs/applications/products may be referred to as software testing.

Software testing may be empirical investigation conducted to provide stakeholders with information about the quality of the product or service under test, with respect to the context in which it is intended to operate. The software testing may also provides an objective, independent view of the software to allow the business to appreciate and understand the risks at implementation of the software. Test techniques include, but are not limited to, the process of executing a program or application with the intent of finding software bugs or defects. The software testing may also be stated as the process of validating and verifying that a software program/application/product that meets the business and technical requirements that guided its design and development; works as expected; or may be implemented with the same characteristics.

Providing status updates of the software testing through manual calculations may utilize a significant amount of work from quality assurance testers. Such manual calculations are subject to errors and time delays. The manual calculations may not reflect a real-time status of the software testing. The results of the manual calculations may be difficult to interpret by individuals not familiar with quality assurance and software testing.

SUMMARY

Several methods and a system for a quality assurance analytic technique and system are disclosed. In one aspect, a method of a client device includes determining a forecasted completion date of a communication of a quality assurance testing data from a quality center database to a server device that includes a processor to analyze based on an algorithm the quality assurance testing data. In addition, the method includes creating a quality assurance project status of a communication of a baseline complete date to the server device to analyze the baseline complete date and the forecasted completion date. The method also includes determining the quality assurance project status that includes a variance in a time from the baseline complete date from an examination of the quality assurance testing data from the quality center database and the forecasted completion date of the server device to assist a user to manage a quality assurance testing project.

In addition, the method may include creating the quality assurance project status of a communication of a baseline start date to the server device to analyze the baseline start date, the baseline complete date, and the forecasted completion date. The quality assurance testing data of the quality center database may be analyzed based on the algorithm of the server device to determine the forecasted completion date that includes a number of total tests, a number of passed tests, a first test date, and/or a last test date. The method may also include determining a test execution trend that includes a number of passed tests, a number of failed tests, and/or a number of not complete tests based on a time of an analysis of the server device of the quality assurance testing data of the quality center database to assist the user to manage the quality assurance testing project. The method may further include determining a group resource execution rate that includes a number of tests executed by an offshore quality assurance team and a number of tests executed by an onshore quality assurance team based on a time of an analysis of the server device of the quality assurance testing data of the quality center database to assist the user to manage the quality assurance testing project.

The method may include determining an individual resource execution rate that includes a number of tests executed by a quality assurance individual based on a time of an analysis of the server device of the quality assurance testing data of the quality center database to assist the user to manage the quality assurance testing project. In addition, the method may include determining a defect trend that includes a linked defect, an unlinked defect, and a severity of the linked defect based on a time of an analysis of the server device of the quality assurance testing data of the quality center database to assist the user to manage the quality assurance testing project.

In another aspect, a method of a server device includes generating a forecasted completion date based on an analysis performed by a processor of applying an algorithm of a quality assurance testing data that includes a number of total tests, a number of passed tests, a first test date, and a last test date of a client device. In addition, the method includes producing a quality assurance project status of a comparison of a difference in time between a baseline complete date of the client device and the forecasted completion date. The method also includes analyzing the quality assurance project status that includes a variance in a time from the baseline complete date from an examination of the quality assurance testing data from the client device and the forecasted completion date to assist a user to manage a quality assurance testing project.

The aforementioned algorithm may include calculating a number of tests left to pass from a multiplication of a project goal percentage and the number of total tests and subtracting the number of passed tests, calculating an average passed rate by dividing the number of total tests by the difference in work days between the first test date and the last test date, calculating a number of work days needed by dividing the number of tests left to pass by the average passed rate; and generating the forecasted completion date by adding the number of work days needed to a current date.

In addition, the method may include producing a quality assurance project status of a comparison of the difference in time between a baseline start date and the baseline complete date of the client device and the forecasted completion date. The method may also include producing a quality assurance project status of an analysis of a project goal percentage of the client device to analyze a number of tests left to pass and to analyze the number of tests left to pass and the forecasted completion date to generate the quality assurance project status. The method may further include generating an actual versus expected test execution rate from a comparison of an actual execution rate from an analysis of the quality assurance testing data and an expected execution rate of the client device to assist the user to manage the quality assurance testing project.

The method may include regenerating the forecasted completion date from the quality assurance testing data that includes the number of total tests, the number of passed tests, the first test date, and/or the last test date and from a number of quality assurance testers and a number of work hours in a day of the user of the client device to adjust the forecasted completion date to assist the user to manage a quality assurance testing project. In addition, the method may include generating a number of quality assurance testers from the quality assurance testing data including the number of total tests, the number of passed tests, the first test date, and/or the last test date and from the baseline end date and a number of work hours in a day of the user of the client device assist the user to manage the quality assurance testing project.

In yet another aspect, a system includes a client device to communicate a quality assurance testing data from a quality center database and a baseline complete date from the client device to a server device to analyze the quality assurance testing data to calculate a forecasted completion date and a quality assurance project status. In addition, the system includes a server device to generate the forecasted completion date from the quality assurance testing data including a number of total tests, a number of passed tests, a first test date, and/or a last test date from the client device and the quality assurance project status by comparing a difference in time between the baseline complete date and the forecasted completion date. The system also includes a number of displays associated with a number of client devices to render the quality assurance project status to a number of users in a number of analytics dashboards rendered in each of the displays and to render the quality assurance project status including a variance in a time from the baseline complete date from an analysis of the quality assurance testing data from the client device and the forecasted completion date from the server device to the client device to assist a user of the client device to manage a quality assurance testing project.

In addition, the system may include the server device to calculate a number of tests left to pass from a multiplication of a project goal percentage and the number of total tests and subtracting the number of passed tests. In addition, the server device of the system may also calculate an average passed rate by dividing the number of total tests by the difference in work days between the first test date an/or the last test date, calculate a number of work days needed by dividing the number of tests left to pass by the average passed rate, and generate the forecasted completion date by adding the number of work days needed to a current date.

The system may include the server device producing a quality assurance project status of a comparison of the difference in time between a baseline stat date and the baseline complete date of the client device and the forecasted completion date to assist a user of the client device to manage a quality assurance testing project. In addition, the system may include the server device to regenerate the forecasted completion date from the quality assurance testing data including the number of total tests, the number of passed tests, the first test date, and/or the last test date and from a number of quality assurance testers and a number of work hours in a day communicated to the server device from the user of the client device to adjust the forecasted completion date to assist the user of the client device to manage a quality assurance testing project.

The server device to generate a test execution trend may include a number of passed tests, a number of failed tests, and a number of not complete tests based on a time from an analysis of the quality assurance testing data from an analysis of the quality assurance testing data a quality center database to assist the user of the client device to manage a quality assurance testing project. The system may further include the server device to generate a actual versus expected test execution rate from a comparison of a actual execution rate from a calculation of the quality assurance testing data from the client device communicating with the quality center database and an expected execution rate from the client device communicating with the user of the client device to assist the user to manage a quality assurance testing project.

Other aspects will be apparent from the following description and the appended claims.

BRIEF DESCRIPTION OF THE VIEWS OF DRAWINGS

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

Several methods and a system for a quality assurance analytic technique and system are disclosed. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
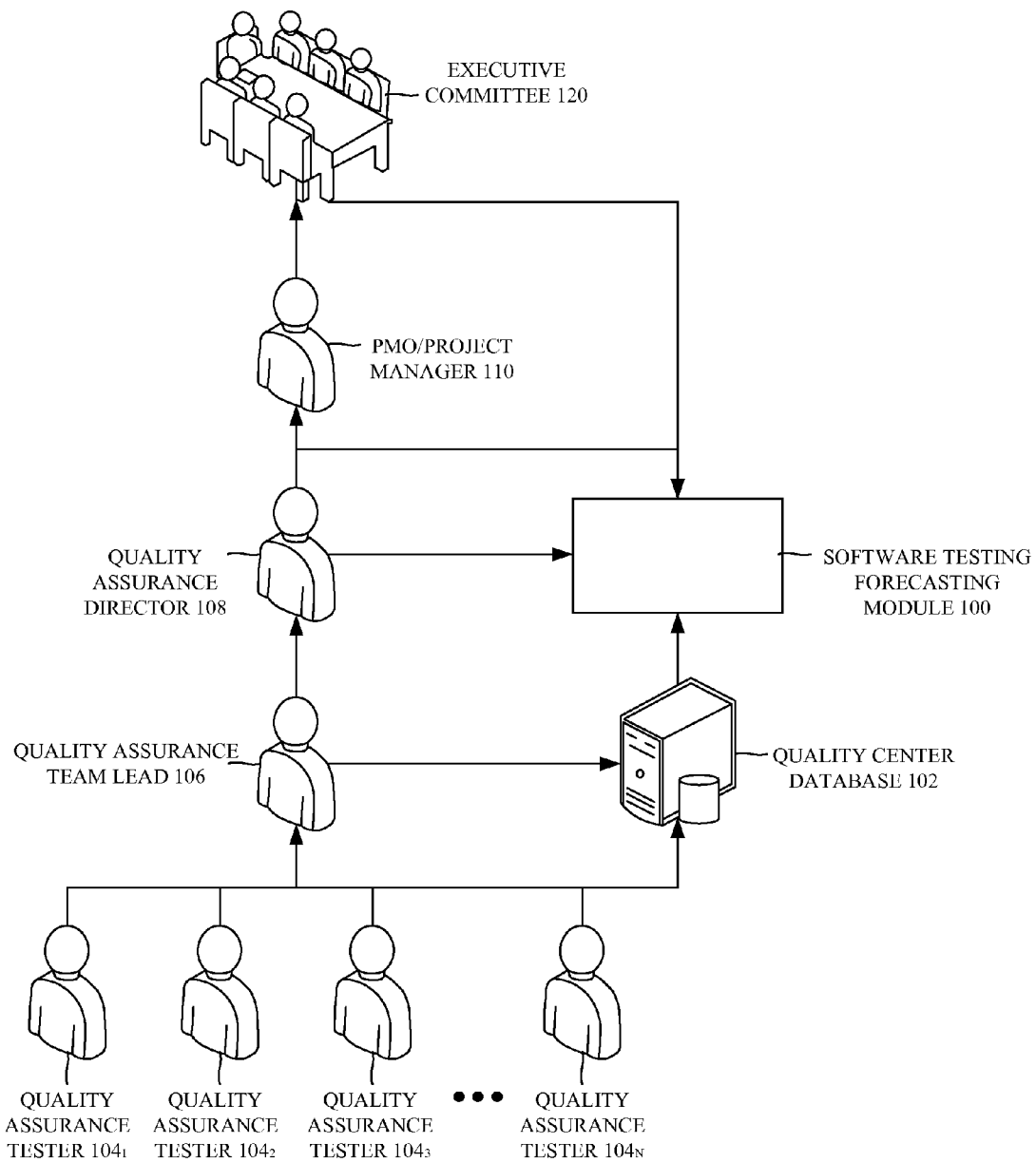
FIG. 1 is a system view illustrating a process of quality assurance (QA) management, according to one or more embodiments.

FIG. 1 is a system view illustrating a process of quality assurance management, according to one or more embodiments. In particular, FIG. 1 illustrates a software testing forecasting module 100, a quality center database 102, Quality Assurance (QA) testers $104_{1-N}$, QA team lead 106, a QA director 108, a Project Management Office (PMO)/project manager 110, an executive committee 120, according to one embodiment.

In one or more embodiment, the software testing forecasting module 100 may be a data processing system for managing quality assurance process. In one or more embodiments, the software testing forecasting module 100 may be automated or manually controlled. Furthermore, the software testing forecasting module 100 may be administered by the QA director 108. In one or more embodiments, the software testing forecasting module 100 may enable users (e.g., the QA testers $104_{1-N}$, the QA team lead 106, the QA director 108, the PMO/project manager 110, the executive committee 120, etc.) to track in real-time the testing progress of Quality Center (QC) projects. In addition, the software testing forecasting module 100 may enable users of the software testing forecasting module 100 to setup several unique views (e.g., graphical), including complete project views as well as sub-project views. In one or more embodiments, the administrator of the QA director 108 may enable the QA testers $104_{1-N}$ to customize the views based on requirement.

In one or more embodiments, the software testing forecasting module 100 is designed to provide metrics, test plans, etc. The metrics provided by the software testing forecasting module 100 may enable the users to manage testing resources, test plans and time lines. Furthermore, the software testing forecasting module 100 may support Variable function analysis function that provides test planning analysis data. The software testing forecasting module 100 may enable the user to plan, allot resource, and complete a testing project within a prescribed time. The quality center database 102 may manage quality assurance testing data. In one or more embodiments, the quality center database 102 may be configured by the QA director. Input to the quality center database 102 may be provided by the users and the database may be updated frequently.

The QA testers $104_{1-N}$ may be professionals who process the software developed by developers for reducing faults and errors (e.g., defect rate). The QA team lead 106 may be an experienced QA tester $104_{1-N}$ who manages a team of QA testers $104_{1-N}$ for testing the software developed by the developers for reducing the defect rate. In one or more embodiments, the QA team lead 106 may perform QA tests on the software project from the architectural perspective. Also, the QA team lead 106 may be responsible for coordinating the project with the QA testers $104_{1-N}$. The QA director 108 may assign software QA projects to the QA team lead 106. The QA director 108 may be responsible for the total quality of the project. In one or more embodiments, the QA director 108 may handle the whole QA process for the complete software project.

The PMO/Project manager 110 may manage complete project including, but not limited to developing, testing, QA testing, architecting and project delivery. In one or more embodiments, the PMO/project manager 110 may analyze and collect requirements, design architecture, provide timelines and provide parameters for the project. In one or more embodiments, the requirements, parameters, the timelines etc. may be input to the software testing forecasting module 100. The QA director 108 may configure the software testing forecasting module 100 based on the inputs provided by the PMO/project manager 110. In one or more embodiments, the QA director 108 may custom configure the software testing forecasting module 100 based on requirements. The QA team lead 106 and the QA testers $104_{1-N}$ may test the software prepared by the developers to reduce fault rate and to make sure that the software meets the requirement in goal as well as in quality. Testing process and progress may be periodically updated in the software testing forecasting module 100. In addition, the process and/or the progress may be viewed online by the users anytime. The executive committee 120 may also be provided GUI's to enable them to understand the process and progress of projects. The executive committee 120 may include a CEO, CFO and/or CIO.

Figure 2:
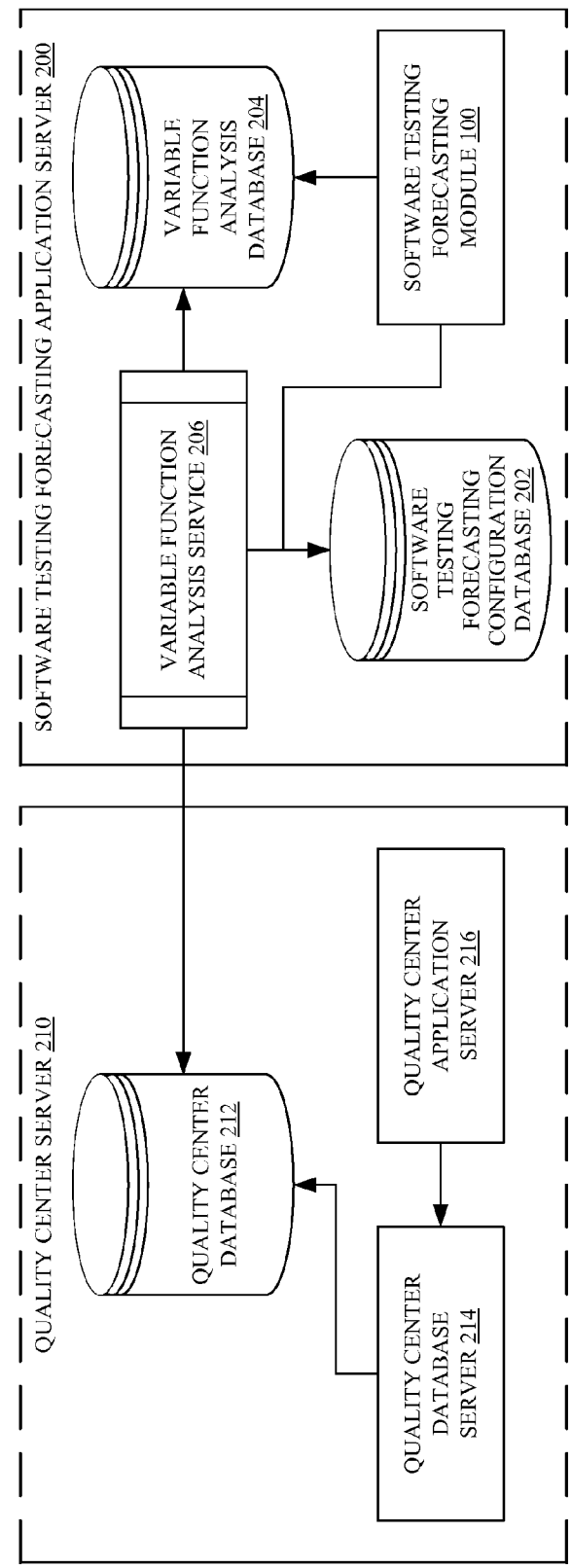
FIG. 2 illustrates a system view of variable function analysis service, according to one or more embodiments.

FIG. 2 illustrates a system view of variable function analysis service, according to one or more embodiments. In one or more embodiments, the variable function analysis service may provided by using history metrics. Existing metrics defined in the software testing forecasting module 100 may be gathered periodically and stored in a repository for comparison. In one or more embodiments, the variable function analysis service may compare historic metrics to the current metrics on various categories. The categories may include, but not limited to dashboard grid metrics, test activity, defects status, forecasted dates and project variance, test trends and defect trends. The categories may further include parameters that are used for comparisons. For example, the dashboard grid metrics may include parameters such as, but not limited to a first test, last test, total tests, pending defects, average tests run/day, percentage passed and status. Similarly, the test trends category may include test execution and resource trends.

The software testing forecasting module 100 may be part of a software testing forecasting application server 200 that communicates with the Quality Center (QC) server 210. The software testing forecasting application server 200 may include inter alia, a software testing forecasting configuration database 202, a variable function analysis database 204, a variable function analysis service 206, and the software testing forecasting module 100. The QC server 210 may include inter alia, QC database 212, a QC database server 214, and a QC application server 216. In one or more embodiments, the QC database 212 may be substantially similar or same as the quality center database 102.

According to one embodiment, the software testing forecasting configuration database 202 may include predefined configurations. In one or more embodiments, the software testing forecasting configuration database 202 may also include manual configurations configured by the administrators. In one or more embodiments, the configurations in the software testing forecasting configuration database 202 may be used for performing testing and quality related operations in the software testing forecasting application server 200. The variable function analysis service 206 may perform analysis of the functions to determine whether the software accomplishes for what it is prepared. In addition, the variable function analysis service 206 may also determine what the functions in the software accomplish. The variable function analysis database 204 may store all the data of the variable function analysis service 206. The software testing forecasting module 100 may provide metrics, test plans, etc to the variable function analysis service 206 for performing variable function analysis.

In one or more embodiments the variable function analysis service 206 may execute intelligence service function to periodically gather merits from QC database 212. The QC database 212 may store all the metrics and parameters. The software testing forecasting module 100 may use this information from the QC database 212 for providing historical comparisons. Also, in one or more embodiments, a web-service interface may be used for communication between the software testing forecasting application server 200 and the QC server 210.

In one or more embodiments, the QC database 212 in the QC server 210 may manage quality assurance testing data. The QC database server 214 may manage the QC database 212. In one or more embodiments, the QC database server 214 may include programs for managing the QC database 212. The QC application server 216 may manage the applications of the QC server 210, the QC database server 214 and the QC database 212.

Figure 3:
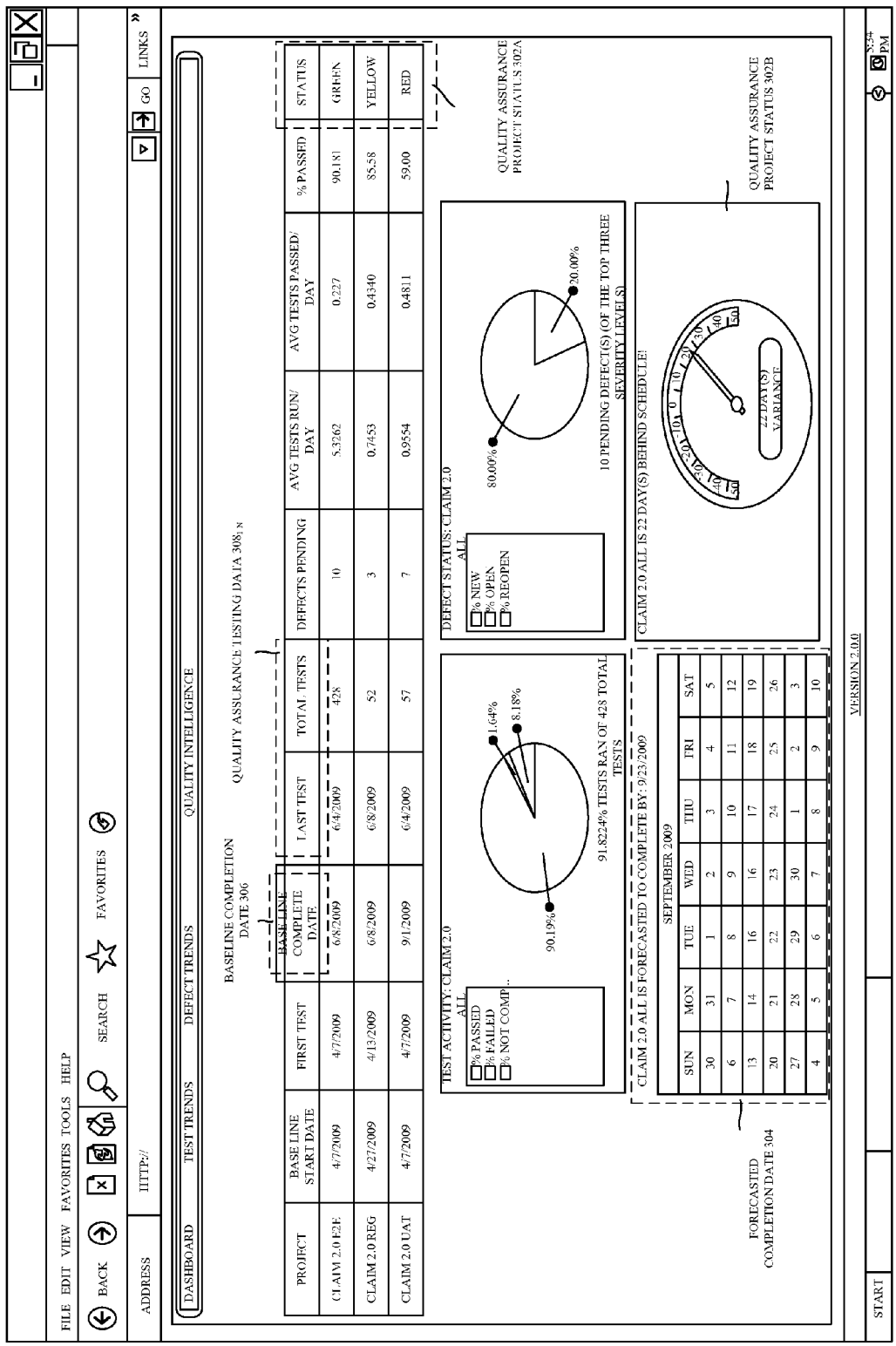
FIG. 3 is a graphical user interface (GUI) illustrating a process and progress of QA, according to an example embodiment.

FIG. 3 is a graphical user interface (GUI) 300 illustrating a process and progress of QA, according to an example embodiment. In particular, FIG. 3 illustrates summary view of the projects in progress. Figure illustrates a table that illustrates current projects and progress of those projects. The table may illustrate fields such as project field for project name, Base Line (BL) start field indicting the planned start of testing as defined in the project's configuration, first test field indicating the date of the first test, BL complete field indicating the planned end of testing as defined in the project's configuration, last test field indicating the date of the last test executed, pending defects field indicating a number of unresolved defects of severity levels, total tests field indicating a number of distinct tests in the test sets, average tests run/day field indicating average number of tests executed per day, the average test passed/day field indicating average number of tests passed per day, percentage passed field indicating the percentage of the total tests that have passed and the status field indicating the status of the project.

The progress may be indicated in table in form of indicators such as a quality assurance project status 302A. In addition, the progress with respect to time of a project of the number of projects may also be graphically indicated such as a quality assurance project status 302B. In addition, the progress, the metrics, the progress, etc. may be shown graphically in form of animations, or in form of spread sheets, etc. Furthermore, a forecast completion date 304 may be automatically illustrated graphically in the GUI. In addition, baseline completion date 306, may indicate the testers $104_{1-N}$ the baseline completion date for the testing project. In addition, the GUI may be configured to illustrate quality assurance testing data $308_{1-N}$. It should be noted that GUI may be designed based on the user. For example, the QA director 108 or the project manager 110 may be interested to view only progress of the project. In another example, the QA testers $104_{1-N}$, and the QA team lead 106 may want to see progress and process with sufficient amount of data. Therefore, the software testing forecasting module 100 may provide options to the user for generating the GUI based on requirements. However, the permissions to enable generation of the customizable GUI may be reserved with the administrator.

Figure 4:
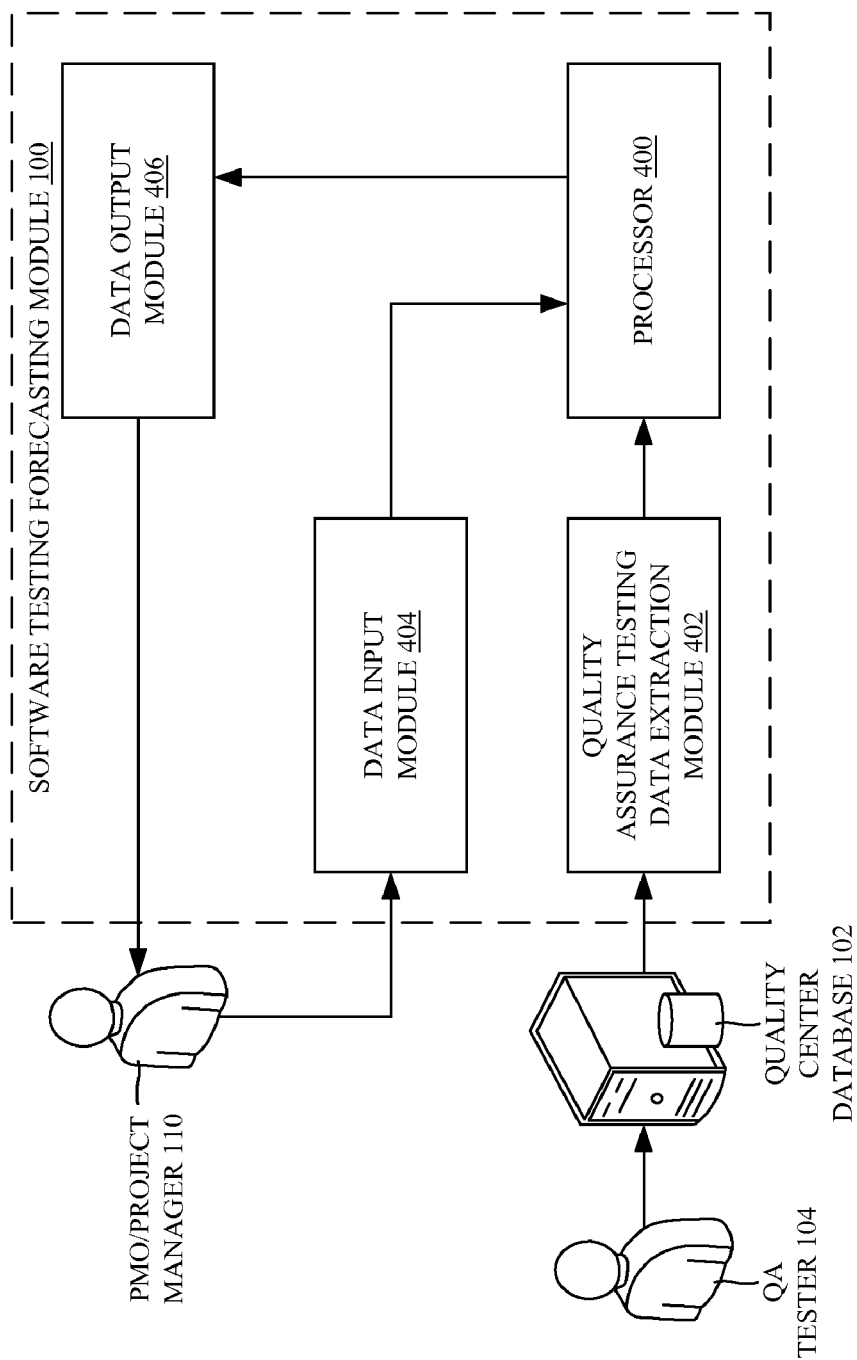
FIG. 4 is a system view illustrating a process of generating software testing forecast, according to one or more embodiments.

FIG. 4 is a system view illustrating a process of generating software testing forecast, according to one or more embodiments. In particular, FIG. 4 illustrates an exploded view of the software testing forecasting module 100, the quality center database 102, the QA tester 104, and the PMO/project manager 110. According to an embodiment, the QA tester 104 may perform analysis and testing of the software developed by the developers. Progress in the testing project, progress in the process, number of errors, bugs, defects, defect status are automatically uploaded into the quality center database 102 periodically. The PMO/project manager 110 may input data to the software testing forecasting module 100 through a data input module 404. In one or more embodiments, the PMO/project manager 110 may input data such as time lines for the projects to be completed, intermediate update reporting dates, etc. In addition, the PMO/project manager 110 may also input configuration data. The software testing forecasting module 100 may implement the data provided by the PMO/project manager 110 and may store the configurations in the quality center database 102. In one or more embodiments, the software testing forecasting module 100 may include a quality assurance testing data extraction module 402. The quality assurance testing data extraction module 402 may extract the quality data periodically from the quality center database 102 using the processor 400. In one or more embodiments, the extracted quality assurance testing data may be used to generate a console (GUI) based on the configurations. The GUI may be output to the user through a data output module 406. In alternate embodiments, the software testing forecasting module 100 may also provide a console for requesting specific data.

Figure 5:
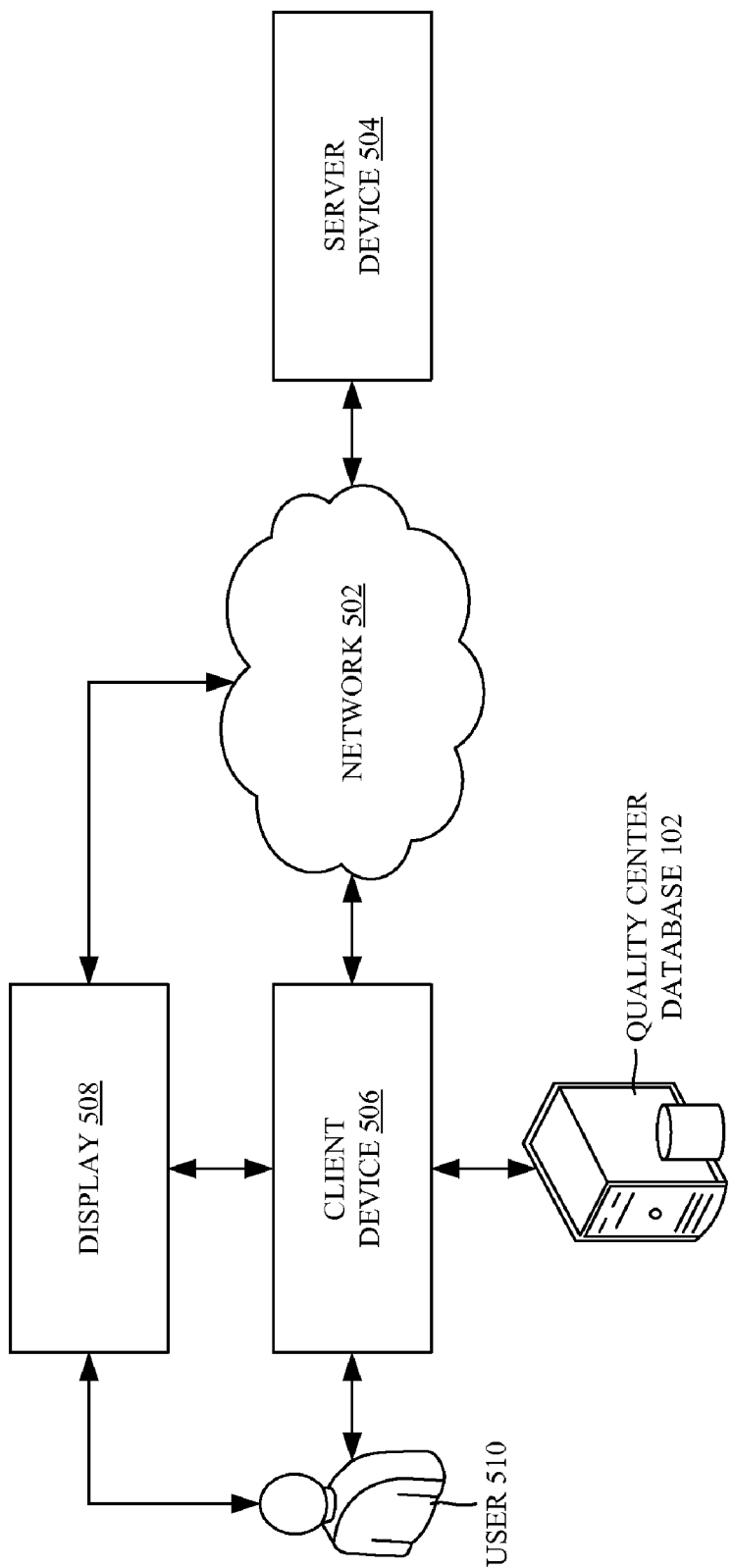
FIG. 5 is a system view illustrating a user using a software testing forecasting tool, according to one or more embodiments.

FIG. 5 is a system view illustrating a user using the software testing forecasting tool, according to one or more embodiments. The user 510 may be a software testing professional, a developer, a project manager, etc. In one or more embodiments, the user 510 may be a software testing professional. The user 510 may test the software assigned to the user 510 in a client device 506 (e.g., a computer, a mobile device). A client device 506 may communicate a quality assurance testing data from the quality center database 102 and the baseline completion date 306 from the client device 506 to a server device 504 to analyze the quality assurance testing data to calculate a forecasted completion date and a quality assurance project status (e.g., the quality assurance project status 302A-B).

In one or more embodiments, a forecasted completion date of a communication of a quality assurance testing data (e.g., the quality assurance testing data $308_{1-N}$) from the quality center database 102 to the server device 504 that includes a processor may be determined to analyze based on an algorithm the quality assurance testing data. In one or more embodiments, the quality assurance project status (e.g., the quality assurance project status 302A-B) of a communication of the baseline completion date 306 to the server device 504 may be created to analyze the baseline complete date and the forecasted completion date.

The quality assurance project status (e.g., the quality assurance project status 302A-B) that includes a variance in a time from the baseline complete date from an examination of the quality assurance testing data from the quality center database 102 and the forecasted completion date of the server device 504 may be determined to assist a user to manage a quality assurance testing project (e.g., as illustrated in FIG. 3). In addition, the quality assurance project status 302A-B of a communication of a baseline start date to the server device 504 to analyze the baseline start date, the baseline complete date, and the forecasted completion date may be created. The quality assurance testing data $308_{1-N}$ of the quality center database 102 may be analyzed based on the algorithm of the server device to determine the forecasted completion date that includes, but not limited to a number of total tests, a number of passed tests, a first test date, and a last test date.

In one or more embodiments, a test execution trend that includes a number of passed tests, a number of failed tests, and a number of not complete tests based on a time of an analysis of the server device 504 of the quality assurance testing data $308_{1-N}$ of the quality center database 102 may be determined to assist the user to manage the quality assurance testing project. In one or more embodiments, a group resource execution rate that includes a number of tests executed by an offshore quality assurance team and a number of tests executed by an onshore quality assurance team based on a time of an analysis of the server device 504 of the quality assurance testing data $308_{1-N}$ of the quality center database 102 may be determined to assist the user to manage the quality assurance testing project. In addition, an individual resource execution rate that includes a number of tests executed by a quality assurance individual based on a time of an analysis of the server device 504 of the quality assurance testing data $308_{1-N}$ of the quality center database 102 may be determined to assist the user to manage the quality assurance testing project through the client device 506. Furthermore, a defect trend that includes, but not limited to a linked defect, an unlinked defect, and a severity of the linked defect based on a time of an analysis of the server device of the quality assurance testing data of the quality center database to assist the user may be determined in the client device 506 to manage the quality assurance testing project.

According to one embodiment, the process and the updates may be updated in the quality center database 102. Software testing data from the client device 506 may be communicated to the server device 504 and the quality center database 102. The server device 504 may generate the forecasted completion date from the quality assurance testing data that includes a number of total tests, a number of passed tests, a first test date, and a last test date from the client device and the quality assurance project status by comparing a difference in time between the baseline complete date and the forecasted completion date.

In one or more embodiments, a forecasted completion date may be generated by the server device 504 based on an analysis performed by a processor of applying an algorithm of a quality assurance testing data that includes a number of total tests, a number of passed tests, a first test date, and a last test date of a client device 506. In addition, a quality assurance project status 302A-B of a comparison of a difference in time between a baseline complete date of the client device and the forecasted completion date may be produced.

Furthermore, the quality assurance project status 302A-B that includes a variance in a time from the baseline complete date from an examination of the quality assurance testing data from the client device 506 and the forecasted completion date may be analyzed to assist a user to manage a quality assurance testing project. The aforementioned algorithm may include steps such as calculating a number of tests left to pass from a multiplication of a project goal percentage and the number of total tests and subtracting the number of passed tests, calculating an average passed rate by dividing the number of total tests by the difference in work days between the first test date and the last test date, calculating a number of work days needed by dividing the number of tests left to pass by the average passed rate, and generating the forecasted completion date by adding the number of work days needed to a current date.

The quality assurance project status 302A-B of a comparison of the difference in time between a baseline start date and the baseline complete date of the client device 506 and the forecasted completion date may be produced. In addition, the quality assurance project status 302A-B of an analysis of a project goal percentage of the client device 506 to analyze a number of tests left to pass and to analyze the number of tests left to pass and the forecasted completion date to generate the quality assurance project status.

Furthermore, a actual versus expected test execution rate from a comparison of a actual execution rate from an analysis of the quality assurance testing data and an expected execution rate of the client device may be generated to assist the user to manage the quality assurance testing project. The forecasted completion date from the quality assurance testing data that includes the number of total tests, the number of passed tests, the first test date, and the last test date and from a number of quality assurance testers and a number of work hours in a day of the user of the client device to adjust the forecasted completion date may be regenerated to assist the user to manage a quality assurance testing project. A number of quality assurance testers from the quality assurance testing data $308_{1-N}$ that includes the number of total tests, the number of passed tests, the first test date, and the last test date and from the baseline end date and a number of work hours in a day of the user of the client device may be generated to assist the user to manage the quality assurance testing project.

In one or more embodiments, the software testing data may be communicated to the server device 504 through a network 502. The server device 504 may extract information from the quality center database 102 and may generate user interfaces to be displayed on a display 508. The display associated with the client device 506 may render the quality assurance project status 302A-B to a user in a number of analytics dashboards rendered in each of the displays and to render the quality assurance project status that includes a variance in a time from the baseline complete date from an analysis of the quality assurance testing data $308_{1-N}$ from the client device 506 and the forecasted completion date from the server device 504 to the client device 506 to assist a user of the client device 506 to manage a quality assurance testing project.

In one or more embodiments, the server device 504 may calculate a number of tests left to pass from a multiplication of a project goal percentage and the number of total tests and subtracting the number of passed tests. In addition, the server device 504 may calculate an average passed rate by dividing the number of total tests by the difference in work days between the first test date and the last test date. Also, the server device 504 may calculate a number of work days needed by dividing the number of tests left to pass by the average passed rate and generates the forecasted completion date by adding the number of work days needed to a current date.

In addition, the server device 504 may regenerate the forecasted completion date from the quality assurance testing data comprising the number of total tests, the number of passed tests, the first test date, and the last test date and from a number of quality assurance testers and a number of work hours in a day communicated to the server device 504 from the user of the client device 506 to adjust the forecasted completion date to assist the user of the client device 506 to manage a quality assurance testing project. Furthermore, the server device 504 may generate a test execution trend comprising a number of passed tests, a number of failed tests, and a number of not complete tests based on a time from an analysis of the quality assurance testing data from an analysis of the quality assurance testing data the quality center database 102 to assist the user of the client device 506 to manage a quality assurance testing project. Also, the server device 504 may generate an actual versus expected test execution rate from a comparison of an actual execution rate from a calculation of the quality assurance testing data from the client device 506 communicating with the quality center database 102 and an expected execution rate from the client device 506 communicating with the user of the client device 506 to assist the user to manage a quality assurance testing project.

Figure 6:
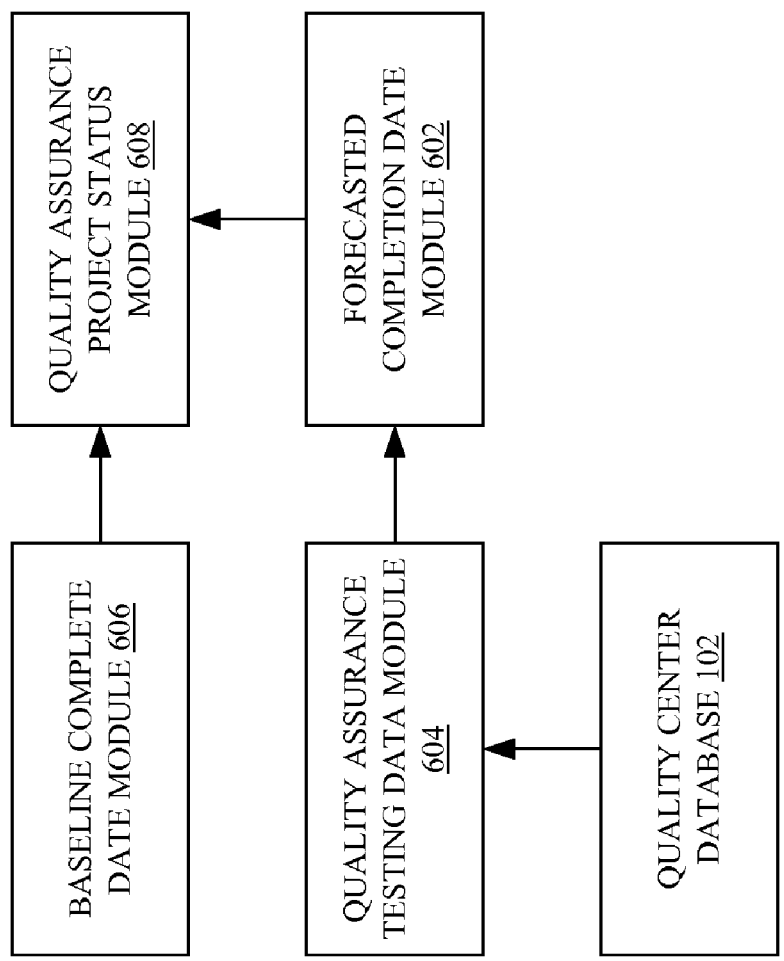
FIG. 6 is a process view illustrating generation of quality assurance project status, according to one or more embodiments.

FIG. 6 is a process view illustrating generation of quality assurance project status, according to one or more embodiments. A quality assurance testing data module 604 may extract information from the quality center database 102. A forecasted completion date module 602 may utilize the information from the quality assurance testing data module 604 to forecast the completion date. A baseline completion date module 606 may be set at a time of project assignment. A quality assurance project status module 608 may intake information from the forecasted completion date module 602 and the baseline completion date module 606 to generate quality assurance project status 302A-B in a form of report or display.

Figure 7A:
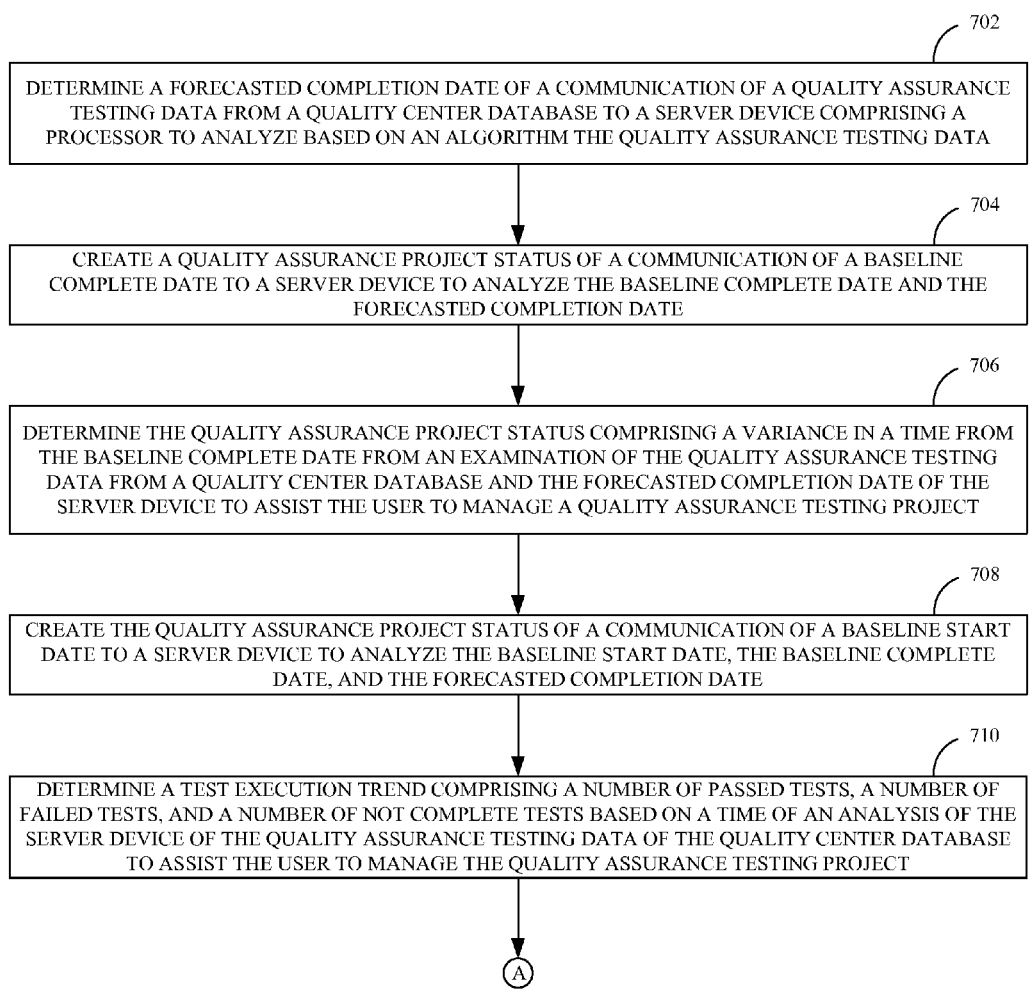
FIG. 7A is a process flow of determining a forecast completion date, according to one embodiment.

FIG. 7A is a process flow of determining a forecast completion date, according to one embodiment. In operation 702, a forecasted completion date of a communication of a quality assurance testing data may be determined from a quality center database 102 to the server device 504 that includes the processor 400 to analyze based on an algorithm the quality assurance testing data. In operation 704, a quality assurance project status of a communication of the baseline completion date 306 to the server device 504 may be created to analyze the baseline completion date 306 and the forecasted completion date. In operation 706, the quality assurance project status including a variance in a time may be determined from the baseline completion date 306 from an examination of the quality assurance testing data from the quality center database 102 and the forecasted completion date of the server device 504 to assist a user to manage a quality assurance testing project. In operation 708, the quality assurance project status of a communication of a baseline start date to the server device 504 may be created to analyze the baseline start date, the baseline complete date, and/or the forecasted completion date. The quality assurance testing data of the quality center database 102 is analyzed based on the algorithm of the server device 504 to determine the forecasted completion date that includes a number of total tests, a number of passed tests, a first test date, and/or a last test date. In operation 710, a test execution trend that includes a number of passed tests, a number of failed tests, and a number of not complete tests based on a time of an analysis of the server device 504 of the quality assurance testing data of the quality center database 102 to assist the user may be determined to manage the quality assurance testing project.

Figure 7B:
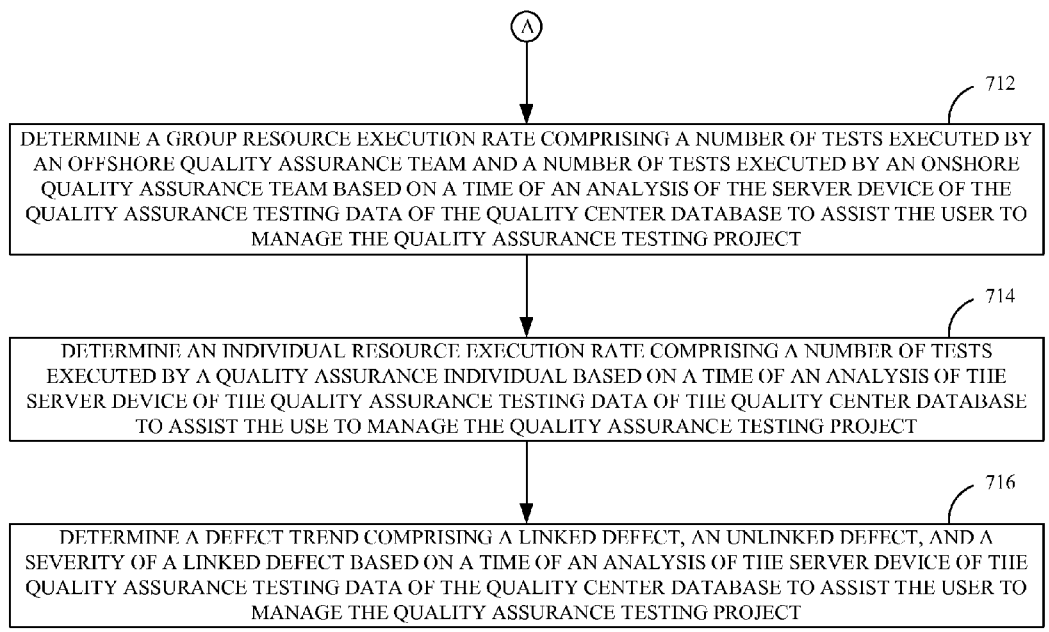
FIG. 7B is a continuation of process flow of FIG. 7A, illustrating additional process, according to one embodiment.

FIG. 7B is a continuation of process flow of FIG. 7A, illustrating additional process, according to one embodiment. In operation 712, a group resource execution rate that includes a number of tests executed by an offshore quality assurance team and a number of tests executed by an onshore quality assurance team based on a time of an analysis of the server device 504 of the quality assurance testing data of the quality center database 102 may be determined to assist the user to manage the quality assurance testing project.

In operation 714, an individual resource execution rate that includes a number of tests executed by a quality assurance individual based on a time of an analysis of the server device of the quality assurance testing data of the quality center database may be determined to assist the user to manage the quality assurance testing project. In operation 716, a defect trend including a linked defect, an unlinked defect, and/or a severity of the linked defect based on a time of an analysis of the server device of the quality assurance testing data of the quality center database may be determined to assist the user to manage the quality assurance testing project.

Figure 8A:
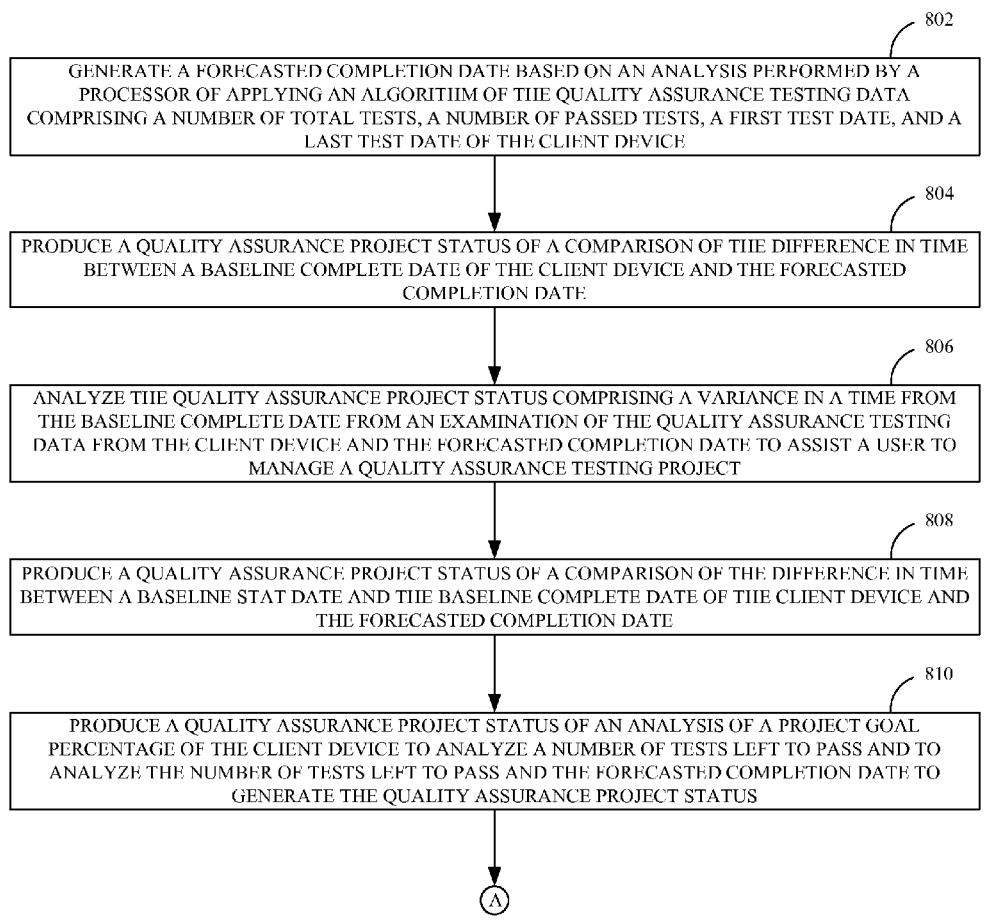
FIG. 8A is a process flow illustrating a generation of a forecasted completion date, according to one embodiment.

FIG. 8A is a process flow illustrating a generation of a forecasted completion date, according to one embodiment. In operation 802, a forecasted completion date may be generated based on an analysis performed by a processor of applying an algorithm of a quality assurance testing data that includes a number of total tests, a number of passed tests, a first test date, and/or a last test date of the client device 506. In operation 804, a quality assurance project status of a comparison of a difference in time between a baseline completion date 306 of the client device 506 and the forecasted completion date may be produced. In operation 806, the quality assurance project status including a variance in a time from the baseline completion date 306 from an examination of the quality assurance testing data from the client device and the forecasted completion date may be analyzed to assist a user to manage a quality assurance testing project.

In operation 808, a quality assurance project status of a comparison of the difference in time between a baseline start date and the baseline completion date 306 of the client device 506 and the forecasted completion date may be produced. In operation 810, a quality assurance project status of an analysis of a project goal percentage of the client device 506 may be produced to analyze a number of tests left to pass and to analyze the number of tests left to pass and the forecasted completion date to generate the quality assurance project status.

Figure 8B:
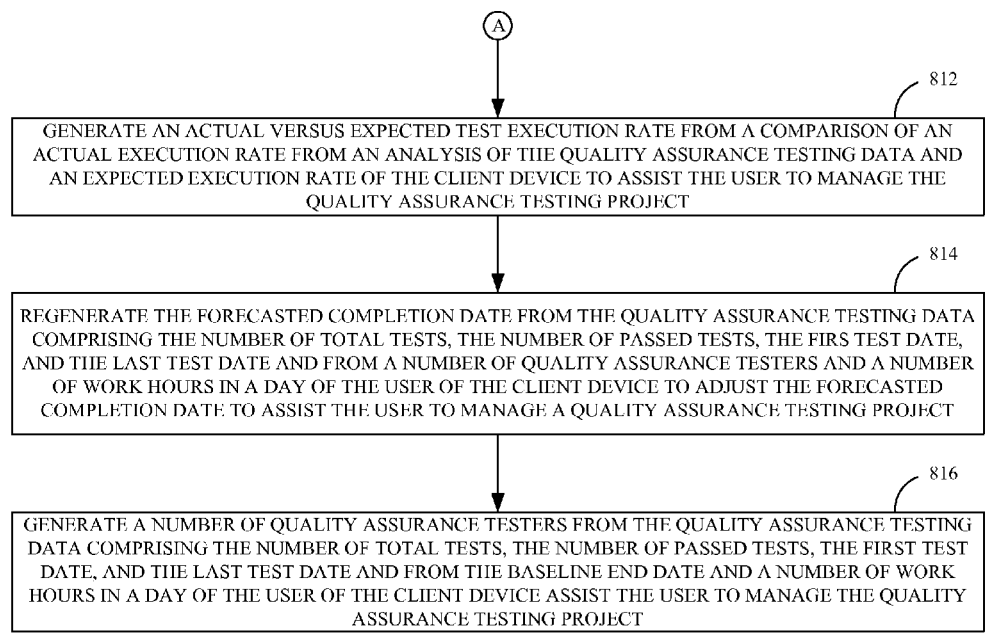
FIG. 8B is a continuation of process flow of FIG. 8A, illustrating additional process, according to one embodiment.

FIG. 8B is a continuation of process flow of FIG. 8A, illustrating additional process, according to one embodiment. In operation 812, a actual versus expected test execution rate from a comparison of a actual execution rate from an analysis of the quality assurance testing data and an expected execution rate of the client device 506 may be generated to assist the user to manage the quality assurance testing project. In operation 814, the forecasted completion date from the quality assurance testing data that includes the number of total tests, the number of passed tests, the first test date, and the last test date and from a number of quality assurance testers and a number of work hours in a day of the user of the client device may be regenerated to adjust the forecasted completion date to assist the user to manage a quality assurance testing project.

In operation 816, a number of quality assurance testers from the quality assurance testing data that includes the number of total tests, the number of passed tests, the first test date, and the last test date and from the baseline end date and a number of work hours in a day of the user of the client device 506 assist the user may be generated to manage the quality assurance testing project.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed:

1. A method of a client device comprising:
    determining a forecasted completion date of a communication of a quality assurance testing data from a quality center database to a server device comprising a processor to analyze based on an algorithm the quality assurance testing data;
    creating a quality assurance project status of a communication of a baseline complete date to the server device to analyze the baseline complete date and the forecasted completion date;
    determining the quality assurance project status comprising a variance in a time from the baseline complete date from an examination of the quality assurance testing data from the quality center database and the forecasted completion date of the server device to assist a user to manage a quality assurance testing project;
    calculating a number of tests left to pass from a multiplication of a project goal percentage and the number of total tests and subtracting a number of passed tests;
    calculating an average passed rate by dividing a number of total tests by a difference in work days between a first test date and a last test date;
    calculating a number of work days needed by dividing a number of tests left to pass by an average passed rate; and
    generating the forecasted completion date by adding a number of work days needed to a current date.

2. The method of claim 1 further comprising:
creating the quality assurance project status of a communication of a baseline start date to the server device to analyze the baseline start date, the baseline complete date, and the forecasted completion date.

3. The method of claim 1 wherein:
the quality assurance testing data of the quality center database is analyzed based on the algorithm of the server device to determine the forecasted completion date comprises the number of total tests, the number of passed tests, the first test date, and the last test date.

4. The method of claim 1 further comprising:
determining a test execution trend comprising the number of passed tests, a number of failed tests, and a number of not complete tests based on a time of an analysis of the server device of the quality assurance testing data of the quality center database to assist a user to manage a quality assurance testing project.

5. The method of claim 1 further comprising:
determining a group resource execution rate comprising a number of tests executed by an offshore quality assurance team and a number of tests executed by an onshore quality assurance team based on a time of an analysis of the server device of the quality assurance testing data of the quality center database to assist the user to manage the quality assurance testing project.

6. The method of claim 1 further comprising:
determining an individual resource execution rate comprising the number of tests executed by a quality assurance individual based on a time of an analysis of the server device of the quality assurance testing data of the quality center database to assist the user to manage the quality assurance testing project.

7. The method of claim 1 further comprising:
determining a defect trend comprising a linked defect, an unlinked defect, and a severity of the linked defect based on a time of an analysis of the server device of the quality assurance testing data of the quality center database to assist the user to manage the quality assurance testing project.

8. A method of a server device comprising:
generating a forecasted completion date based on an analysis performed by a processor of applying an algorithm of a quality assurance testing data comprising a number of total tests, a number of passed tests, a first test date, and a last test date of a client device;
producing a quality assurance project status of a comparison of a difference in time between a baseline complete date of the client device and the forecasted completion date;
analyzing the quality assurance project status comprising a variance in a time from the baseline complete date from an examination of the quality assurance testing data from the client device and the forecasted completion date to assist a user to manage a quality assurance testing project;
calculating a number of tests left to pass from a multiplication of a project goal percentage and the number of total tests and subtracting the number of passed tests;
calculating an average passed rate by dividing the number of total tests by the difference in work days between the first test date and the last test date;
calculating a number of work days needed by dividing the number of tests left to pass by the average passed rate; and
generating the forecasted completion date by adding the number of work days needed to a current date.

9. The method of claim 8 further comprising:
producing the quality assurance project status of a comparison of the difference in time between a baseline start date and the baseline complete date of the client device and the forecasted completion date.

10. The method of claim 8 further comprising:
producing a quality assurance project status of an analysis of a project goal percentage of the client device to analyze a number of tests left to pass and to analyze the number of tests left to pass and the forecasted completion date to generate the quality assurance project status.

11. The method of claim 8 further comprising:
generating an actual versus expected test execution rate from a comparison of an actual execution rate from an analysis of the quality assurance testing data and an expected execution rate of the client device to assist the user to manage the quality assurance testing project.

12. The method of claim 8 further comprising:
regenerating the forecasted completion date from the quality assurance testing data comprising the number of total tests, the number of passed tests, the first test date, and the last test date and from a number of quality assurance testers and a number of work hours in a day of the user of the client device to adjust the forecasted completion date to assist the user to manage the quality assurance testing project.

13. The method of claim 8 further comprising:
generating a number of quality assurance testers from the quality assurance testing data comprising the number of total tests, the number of passed tests, the first test date, and the last test date and from the baseline end date and a number of work hours in a day of the user of the client device assist the user to manage the quality assurance testing project.

14. A system, having a processor, comprising:
a client device, having a processor, to communicate a quality assurance testing data from a quality center database and a baseline complete date from the client device to a server device to analyze the quality assurance testing data to calculate a forecasted completion date and a quality assurance project status;
a server device, having a processor, to generate the forecasted completion date from the quality assurance testing data comprising a number of total tests, a number of passed tests, a first test date, and a last test date from the client device and the quality assurance project status by comparing a difference in time between the baseline complete date and the forecasted completion date;
a plurality of hardware displays associated with a plurality of client devices to render the quality assurance project status to a plurality of users in a plurality of analytics dashboards rendered in each of the displays and to render the quality assurance project status comprising a variance in a time from the baseline complete date from an analysis of the quality assurance testing data from the client device and the forecasted completion date from the server device to the client device to assist a user of the client device to manage a quality assurance testing project,
wherein the server device is used to:
calculate a number of tests left to pass from a multiplication of a project goal percentage and the number of total tests and subtracting the number of passed tests,
calculate an average passed rate by dividing the number of total tests by a difference in work days between the first test date and the last test date, calculate a number of work days needed by dividing the number of tests left to pass by the average passed rate, and generate the forecasted completion date by adding the number of work days needed to a current date.

15. The system of claim 14 further comprising:

the server device producing the quality assurance project status of a comparison of the difference in time between a baseline stat date and the baseline complete date of the client device and the forecasted completion date to assist the user of the client device to manage the quality assurance testing project.

16. The system of claim 14 further comprising:

the server device to regenerate the forecasted completion date from the quality assurance testing data comprising the number of total tests, the number of passed tests, the first test date, and the last test date and from a number of quality assurance testers and a number of work hours in a day communicated to the server device from the user of the client device to adjust the forecasted completion date to assist the user of the client device to manage the quality assurance testing project.

17. The system of claim 14 wherein:

the server device to generate a test execution trend comprising the number of passed tests, a number of failed tests, and a number of not complete tests based on a time from an analysis of the quality assurance testing data from the quality center database to assist the user of the client device to manage the quality assurance testing project.

18. The system of claim 14 further comprising:

the server device to generate an actual versus expected test execution rate from a comparison of an actual execution rate from a calculation of the quality assurance testing data from the client device communicating with the quality center database and an expected execution rate from the client device communicating with the user of the client device to assist the user to manage the quality assurance testing project.

* * * * *